(12) United States Patent
Konno et al.

(10) Patent No.: US 11,938,655 B2
(45) Date of Patent: Mar. 26, 2024

(54) TAPE-SHAPED PREPREG AND A METHOD FOR PRODUCTION THEREOF

(71) Applicant: TORAY INDUSTRIES, INC., Tokyo (JP)

(72) Inventors: Eita Konno, Nagoya (JP); Taito Ueda, Nagoya (JP); Mayuka Yamada, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 520 days.

(21) Appl. No.: 16/772,502

(22) PCT Filed: Dec. 13, 2018

(86) PCT No.: PCT/JP2018/045826
§ 371 (c)(1),
(2) Date: Jun. 12, 2020

(87) PCT Pub. No.: WO2019/124203
PCT Pub. Date: Jun. 27, 2019

(65) Prior Publication Data
US 2020/0385540 A1  Dec. 10, 2020

(30) Foreign Application Priority Data

Dec. 22, 2017  (JP) ................................. 2017-245913
Dec. 22, 2017  (JP) ................................. 2017-245914

(51) Int. Cl.
*C08J 5/24*  (2006.01)
*B29B 11/16*  (2006.01)
(Continued)

(52) U.S. Cl.
CPC ............ *B29B 15/122* (2013.01); *B29B 11/16* (2013.01); *B29C 70/20* (2013.01); *B29C 70/52* (2013.01);
(Continued)

(58) Field of Classification Search
None
See application file for complete search history.

(56) References Cited

U.S. PATENT DOCUMENTS 5,462,618 A * 10/1995 Rogers ...................... B64C 1/18
264/108
5,639,544 A *  6/1997 Miyaji ................. H05K 1/0333
428/156
(Continued)

FOREIGN PATENT DOCUMENTS

CN    103847111 B  *  5/2016
CN    105619842 A  *  6/2016
(Continued)

OTHER PUBLICATIONS

Machine translation of Chinese Patent 103847111, date unknown.*
(Continued)

*Primary Examiner* — Jeffrey A Vonch
(74) *Attorney, Agent, or Firm* — Birch, Stewart, Kolasch & Birch, LLP

(57) ABSTRACT

The invention aims to provide a tape-shaped prepreg including unidirectionally oriented reinforcing fibers and a thermoplastic resin composition and being high in handleability during molding and high in adhesiveness to other members. The tape-shaped prepreg includes unidirectionally oriented reinforcing fibers and a thermoplastic resin composition and has an arithmetic average roughness (Ra) of 0.1 to 10 μm in a direction perpendicular to the orientation direction of the reinforcing fibers, as measured according to JIS B 0601: 2013, and a warpage rate of 5% or less as determined by the procedure specified in (i) to (iii) below: (i) place a test piece of the above tape-shaped prepreg having a length of 100 mm in the fiber orientation direction on a plane in such manner that the end portions curl upward, (ii) measure the vertical distance from the highest position at the right end of the
(Continued)

curled tape to the plane, which is denoted by a, and the vertical distance from the highest position at the left end to the plane, which is denoted by b, and calculate the arithmetic average of a and b, which is defined as the warpage distance, and (iii) calculate the warpage rate by the following equation: warpage rate (%)=warpage distance (mm)/100 (mm)×100.

20 Claims, 4 Drawing Sheets

(51) Int. Cl.
| | |
|---|---|
| B29B 15/12 | (2006.01) |
| B29C 70/20 | (2006.01) |
| B29C 70/52 | (2006.01) |
| B32B 5/26 | (2006.01) |
| B32B 5/28 | (2006.01) |
| B29K 77/00 | (2006.01) |
| B29K 101/12 | (2006.01) |
| B29K 105/08 | (2006.01) |
| B29K 307/04 | (2006.01) |

(52) U.S. Cl.
CPC .......... *B29C 70/521* (2013.01); *B29C 70/528* (2013.01); *B32B 5/26* (2013.01); *C08J 5/243* (2021.05); *B29B 15/12* (2013.01); *B29K 2077/00* (2013.01); *B29K 2101/12* (2013.01); *B29K 2105/0872* (2013.01); *B29K 2105/0881* (2013.01); *B29K 2307/04* (2013.01); *B32B 2307/538* (2013.01); *C08J 2377/00* (2013.01); *Y10T 428/24994* (2015.04); *Y10T 428/249942* (2015.04); *Y10T 428/249944* (2015.04); *Y10T 428/249945* (2015.04); *Y10T 428/31* (2015.01)

(56) References Cited

U.S. PATENT DOCUMENTS

| | | | | |
|---|---|---|---|---|
| 2009/0252916 | A1* | 10/2009 | Heidrich | B32B 5/024 264/258 |
| 2012/0100362 | A1* | 4/2012 | Ellis | C08J 5/243 428/297.4 |
| 2012/0121866 | A1* | 5/2012 | Hawkins | B29C 70/30 156/212 |
| 2013/0164498 | A1* | 6/2013 | Langone | B32B 27/285 428/221 |
| 2017/0129155 | A1 | 5/2017 | Tashiro et al. | |
| 2017/0165875 | A1 | 6/2017 | Gaillard et al. | |
| 2018/0001572 | A1* | 1/2018 | MacAdams | B05D 3/007 |
| 2018/0162073 | A1 | 6/2018 | Fujiura et al. | |
| 2018/0243999 | A1* | 8/2018 | Wakazono | B29C 70/528 |
| 2021/0214270 | A1* | 7/2021 | Shimizu | C03C 8/02 |

FOREIGN PATENT DOCUMENTS

| | | | | |
|---|---|---|---|---|
| CN | 106113531 | A | * 11/2016 | ............ B29C 69/02 |
| CN | 106626444 | A | * 5/2017 | |
| EP | 3 170 638 | A1 | 5/2017 | |
| EP | 3 299 408 | A1 | 3/2018 | |
| JP | 05098042 | A | * 4/1993 | |
| JP | 6-31821 | A | 2/1994 | |
| JP | 2003138043 | A | * 5/2003 | |
| JP | 2004051660 | A | * 2/2004 | |
| JP | 2005161797 | A | * 6/2005 | |
| JP | 2007-76224 | A | 3/2007 | |
| JP | 2007-118216 | A | 5/2007 | |
| JP | 2008246782 | A | * 10/2008 | |
| JP | 2013-159723 | A | 8/2013 | |
| JP | 2015-221867 | A | 12/2015 | |
| JP | 2016-83923 | A | 5/2016 | |
| JP | 2016-216654 | A | 12/2016 | |
| WO | WO 2016/009735 | A1 | 1/2016 | |
| WO | WO 2016009735 | A1 | 1/2016 | |
| WO | WO 2016/190194 | A1 | 12/2016 | |

OTHER PUBLICATIONS

Machine translation of Chinese Patent 105619842, date unknown.*
Mitutoyo Catalogue, Quick Guide to Precision Measuring Instruments, 2018 (Year: 2018).*
International Search Report, issued in PCT/JP2018/045826, PCT/ISA/210, dated Feb. 26, 2019.
Written Opinion of the International Searching Authority, issued in PCT/JP2018/045826, PCT/ISA/237, dated Feb. 26, 2019.
"Measurement Results on PEEK-OPTIMA LT3PPT50A batches PPT0017, PPT0018, and PPT0021", 2 pages total.
"ENDOLIGN—Composite Material for Superior Structural Implants", Healthcare-In-Europe.com. Nov. 16, 2007 (cited Mar. 30, 2023), 1 page.
"Form Talysurf Intra Operator's Handbook", Taylor Hobson, No. 1.5, Jun. 2002, pp. 1-186 (190 pages total).
"Geometrical Product Specifications (GPS)—Surface Texture: Profile method—Nominal Characteristics of Contact (Stylus) Instruments", Japanese Industrial Standard, Jan. 31, 2001, 15 pages total.
"Invibio Launches ENDOLIGN Polymer Composite", Med Device Online, Sep. 19, 2006 (cited Mar. 30, 2023), 1 page.
Certificate of Analysis for ENDOLIGN Composite Pre-Preg Tape Batch No. PPT0017 PEEK-OPTIMA LT3PPT50A, May 26, 2011, 1 page.
Certificate of Analysis for ENDOLIGN Composite Pre-Preg Tape Batch No. PPT0018 PEEK-OPTIMA LT3PPT50A, May 26, 2011, 1 page.
Certificate of Analysis for ENDOLIGN Composite Pre-Preg Tape Batch No. PPT0021 PEEK-OPTIMA LT3PPT50A , Sep. 16, 2011, 1 page.
Comer et al., "Mechanical Characterisation of Carbon Fibre-PEEK Manufactured by Laser-Assisted Automated-Tape-Placement and Autoclave", Composites: Part A, vol. 69, 2015, pp. 10-20.
Declaration by John Devine in the matter of: European Patent No. 3730364, dated May 19, 2023, 1 page total.
European Communication of a Notice of Opposition for European Application No. 18892541.6, dated May 26, 2023.
Ferguson et al., "The Long-Term Mechanical Integrity of Non-Reinforced PEEK-OPTIMA Polymer for Demanding Spinal Applications: Experimental and Finite-Element Analysis", European Spine Journal, vol. 15, 2005 (published online Jun. 7, 2005), pp. 149-156.
Invoice dated May 27, 2011, for sale and dispatch of ENDOLIGN LT3PPT50A PPT0017 and PPT0018 to Carbofix Orthopedics LTD.
Invoice dated May 30, 2013, for sale and dispatch of ENDOLIGN LT3PPT50A PPT0021 to Hexagon Teknolojik.
Mitutoyo "Quick Guide to Surface Roughness Measurements", Bulletin No. 2229, Dec. 2016, pp. 1-6 (8 pages total).

* cited by examiner

[Fig. 1]
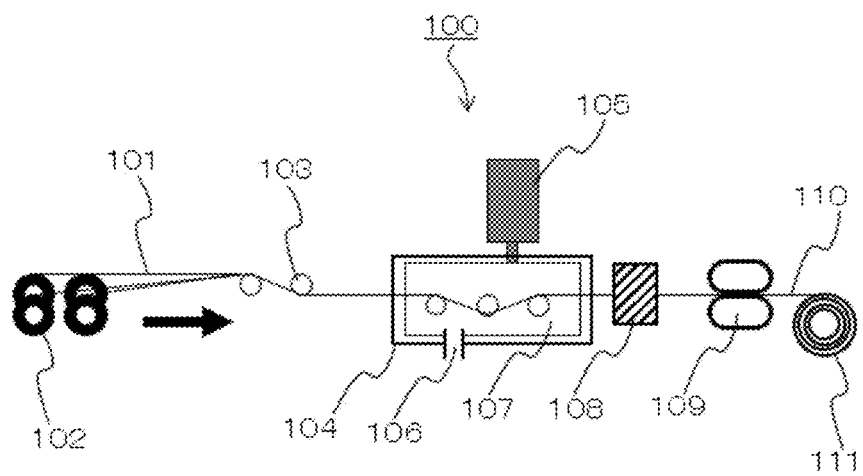
[Fig. 2]
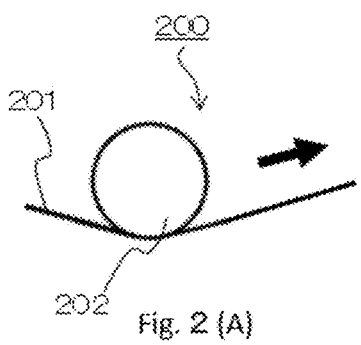
Fig. 2 (A)
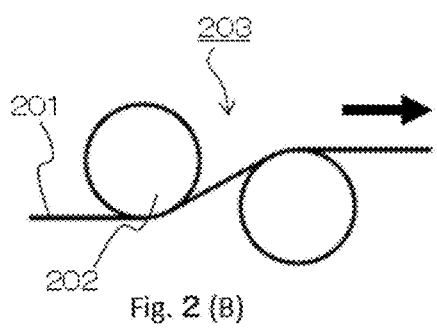
Fig. 2 (B)
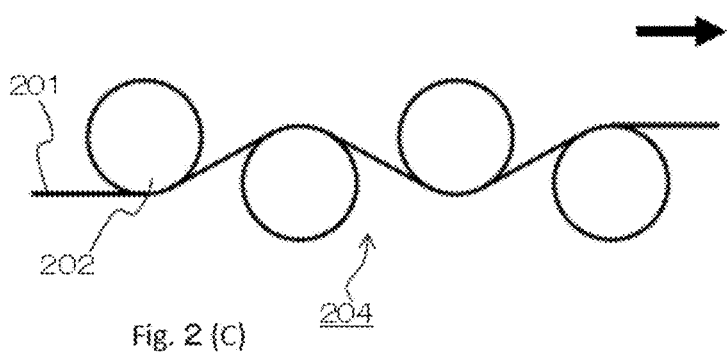
Fig. 2 (C)

TAPE-SHAPED PREPREG AND A METHOD FOR PRODUCTION THEREOF

TECHNICAL FIELD

The present invention relates to a tape-shaped prepreg that includes unidirectionally oriented reinforcing fibers and a thermoplastic resin composition and a method for the production thereof. More specifically, the present invention relates to a tape-shaped prepreg that is high in handleability and adhesiveness to other members and a method for the production thereof.

BACKGROUND ART

Being light in weight and excellent in mechanical properties, composite materials formed of reinforcing fibers and matrix resins have been in wide use in such areas as sporting goods, aerospace applications, vehicles, ships, and other general industrial applications. In particular, fiber reinforced thermoplastic resin materials including thermoplastic resins as the above-mentioned resins can be melted easily by heating and solidified easily by cooling, as compared to fiber reinforced thermosetting resin materials, and therefore, they are expected to have good effects such as an improvement in handleability during molding processes, shortening of cycle times, and the like, and are drawing attentions from the viewpoint of improving the productivity and reducing the costs.

In recent years, fiber reinforced thermoplastic resin materials have been used in a wide variety of applications and have been modified variously to suite further segmentalized applications. When used as laminate plies or partial reinforcing materials, tape-shaped prepregs including unidirectionally oriented reinforcing fibers as reinforcing fibers have excellent mechanical properties, and therefore there are increasing demands for them as intermediate base materials.

When a tape-shaped prepregs are used as laminate plies or reinforcing materials, their handleability and applicability to automatic molding machines will deteriorate if large warp exists in the tape-shaped prepreg. In addition, its moldability will decrease to deteriorate the productivity if its surface smoothness is low.

A prior art document (Patent document 1) describes an injection molded article made of a fiber reinforced thermoplastic resin intended for use in the top plates of notebook type personal computers, surfaces of digital cameras, and the like, and specifies the warpage of such molded articles.

Another prior art document (Patent document 2) describes a manufacturing method and an apparatus to achieve sufficient impregnation of a plurality of continuous reinforcing fibers with thermoplastic resins.

Furthermore, still another prior art document (Patent document 3) describes a manufacturing method and an apparatus to produce tape-shaped prepregs containing a decreased number of defects based on relations specified between the thickness of tape-shaped prepregs and the distance between the nozzle and the cooling mechanism through which the tape-shaped prepregs travel.

PRIOR ART DOCUMENTS

Patent Documents

Patent document 1: Japanese Unexamined Patent Publication (Kokai) No. 2004-291558
Patent document 2: Patent No. 5626660
Patent document 3: Japanese Unexamined Patent Publication (Kokai) No. 2016-83923

SUMMARY OF INVENTION

Problems to be Solved by the Invention

When a thermoplastic resin composition is used, the production process requires heating and cooling steps. In the cooling step, in particular, shrinkage of the thermoplastic resin composition occurs due to the cooling, and therefore it can be said that it is difficult for this intermediate base material to avoid warp or roughening of the surface.

In Patent document 1, however, there is no description about the occurrence of warp in tape-shaped prepregs intended to serve as intermediate base materials, and its handleability as intermediate base material is not addressed.

Furthermore, Patent document 2 mentioned above contains no detailed description about a cooling mechanism or a cooling method for preventing warp and surface roughening, and Patent document 3 mentioned above contains no detailed description about the heat absorbing capacity of the cooling mechanism used or the influence of the cooling mechanism on the warp and the surface properties of the tape-shaped prepreg.

The present invention have relations to the above-mentioned conventional techniques, and an object thereof is to provide a tape-shaped prepreg that is high in the handleability during molding and high in adhesiveness to other members.

Means of Solving the Problems

As a result of intensive investigations aiming to solve the above problems, the present inventors have arrived at the tape-shaped prepreg and the manufacturing method thereof described below.

The present invention provides a tape-shaped prepreg including unidirectionally oriented reinforcing fibers and a thermoplastic resin composition, having an arithmetic average roughness (Ra) of 0.1 to 10 μm in a direction perpendicular to the orientation direction of the reinforcing fibers, as measured according to JIS B 0601: 2013, and having a warpage rate of 5% or less as determined by the procedure specified in (i) to (iii) below:

(i) place a test piece of the above tape-shaped prepreg having a length of 100 mm in the fiber orientation direction on a plane in such manner that the end portions curl upward,
(ii) measure the vertical distance from the highest position at the right end of the curled tape to the plane, which is denoted by a, and the vertical distance from the highest position at the left end to the plane, which is denoted by b, and calculate the arithmetic average of a and b, which is defined as the warpage distance,
(iii) calculate the warpage rate by the following equation:

$$\text{warpage rate (\%)} = \text{warpage distance [mm]}/100\text{ [mm]} \times 100.$$

Another embodiment of the invention provides a tape-shaped prepreg including unidirectionally oriented reinforcing fibers and a thermoplastic resin composition, giving a waviness curve having a maximum cross-sectional height (Wt) of 80 μm or less in a direction perpendicular to the orientation direction of the reinforcing fibers, as measured according to JIS B 0601: 2013, and
and having a warpage rate of 5% or less as determined by the procedure specified in (i) to (iii) below:

(i) place a test piece of the above tape-shaped prepreg having a length of 100 mm in the fiber orientation direction on a plane in such manner that the end portions curl upward,
(ii) measure the vertical distance from the highest position at the right end of the curled tape to the plane, which is denoted by a, and the vertical distance from the highest position at the left end to the plane, which is denoted by b, and calculate the arithmetic average of a and b, which is defined as the warpage distance, and
(iii) calculate the warpage rate by the following equation:

warpage rate (%)=warpage distance [mm]/100 [mm]×100.

The method for producing a tape-shaped prepreg according to the present invention includes the steps of putting a thermoplastic resin composition in a molten state into a tank having an inlet portion and an outlet portion, introducing a plurality of continuous reinforcing fibers from the inlet portion of the tank so that they are impregnated with the resin composition, and making the thermoplastic resin composition and the plurality of continuous reinforcing fibers exit through the outlet portion of the tank and then pass through a cooling mechanism to produce a tape-shaped prepreg,
and meets the following relation (A) between Pc and Qp, wherein Pc [W] is the heat absorbing capacity of the cooling mechanism and Qp [m³/s] is the volume of the tape-shaped prepreg passing through the cooling mechanism in one second:

$$2.8 \times 10^8 \leq Pc/Qp \leq 23.2 \times 10^8 \quad (A)$$

Advantageous Effects of the Invention

The present invention can provide a tape-shaped prepreg that is excellent in handleability during molding and excellent in adhesiveness to other members, and a tape-shaped prepreg production method that serves for high productivity production of a tape-shaped prepreg high in surface smoothness and dimensional accuracy.

BRIEF DESCRIPTION OF THE DRAWINGS

FIG. 1 This is a schematic diagram showing an example of the production method according to the present invention.

FIG. 2 This is a schematic diagram showing an example of a cooling mechanism of a tape-shaped prepreg holding structure of the roller-shaped member type.

DESCRIPTION OF PREFERRED EMBODIMENTS

Figure 3:
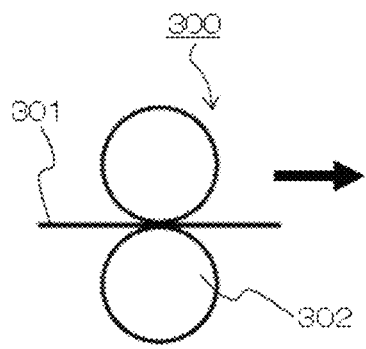
FIG. 3 This is a schematic diagram showing an example of a cooling mechanism of a tape-shaped prepreg interposing structure of the roller-shaped member type.
Figure 3:
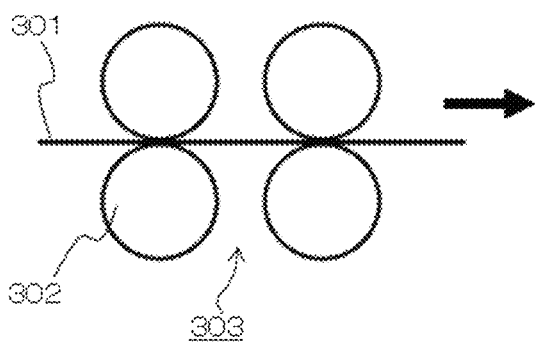

The present invention relates to a tape-shaped prepreg that includes unidirectionally oriented reinforcing fibers and a thermoplastic resin composition and a method for the production thereof.

The present invention provides a tape-shaped prepreg including unidirectionally oriented reinforcing fibers and a thermoplastic resin composition,
having an arithmetic average roughness (Ra) of 0.1 to 10 μm in a direction perpendicular to the orientation direction of the reinforcing fibers, as measured according to JIS B 0601: 2013, and
having a warpage rate of 5% or less as determined by the procedure specified in (i) to (iii) below:
(i) place a test piece of the above tape-shaped prepreg having a length of 100 mm in the fiber orientation direction on a plane in such manner that the end portions curl upward,
(ii) measure the vertical distance from the highest position at the right end of the curled tape to the plane, which is denoted by a, and the vertical distance from the highest position at the left end to the plane, which is denoted by b, and calculate the arithmetic average of a and b, which is defined as the warpage distance,
(iii) calculate the warpage rate by the following equation:

warpage rate (%)=warpage distance [mm]/100 [mm]×100.

For the present invention, the tape-shaped prepreg means a prepreg having a continuous length in the direction in which the reinforcing fibers are oriented.

The width is usually 1,000 mm, but the invention is not limited to this. The tape-shaped prepreg may be simply referred to as prepreg.

The feature of the tape-shaped prepreg according to the present invention of having an arithmetic average roughness (Ra) of 0.1 to 10 μm in a direction perpendicular to the orientation direction of the reinforcing fibers, as measured according to JIS B 0601: 2013, and having a warpage rate of 5% or less as determined by the procedure specified in (i) to (iii) above serves to provide a tape-shaped prepreg that is high in handleability during manual molding operation and in handleability during processing by an automatic machine and that has a smooth surface to ensure stronger adhesion to other members.

Another embodiment of the tape-shaped prepreg according to the present invention provides a tape-shaped prepreg including unidirectionally oriented reinforcing fibers and a thermoplastic resin composition,
giving a waviness curve having a maximum cross-sectional height (Wt) of 80 μm or less in a direction perpendicular to the orientation direction of the reinforcing fibers, as measured according to JIS B 0601: 2013, and
having a warpage rate of 5% or less as determined by the procedure specified in (i) to (iii) above. In this case, the feature of the tape-shaped prepreg according to the present invention of giving an waviness curve having a maximum cross-sectional height (Wt) of 80 μm or less in a direction perpendicular to the orientation direction of the reinforcing fibers, as measured according to JIS B 0601: 2013, and having a warpage rate of 5% or less as determined by the procedure specified in (i) to (iii) above serves to provide a tape-shaped prepreg that is high in handleability during manual molding operation and in handleability during processing by an automatic machine and can be easily shaped into a desired form when used to produce a laminate or reinforce other members, thereby ensuring a high handleability during adhesion operation to realize strong adhesion with other members.

Furthermore, it is more preferable that the tape-shaped prepreg according to the present invention includes unidirectionally oriented reinforcing fibers and a thermoplastic resin composition, has an arithmetic average roughness (Ra) of 0.1 to 10 μm in a direction perpendicular to the orientation direction of the reinforcing fibers, as measured according to JIS B 0601: 2013, gives a waviness curve having a maximum cross-sectional height (Wt) of 80 μm or less in a direction perpendicular to the orientation direction of the reinforcing fibers, as measured according to JIS B 0601: 2013, and has a warpage rate of 5% or less as determined by the procedure specified in (i) to (iii) above. Meeting these requirements makes it easy to shape the tape-shaped prepreg into a desired form when used to produce a laminate or reinforce other members, thereby allowing the tape-shaped prepreg to have both an improved handleability during molding and a stronger adhesion to other members realized by a smooth surface.

For the tape-shaped prepreg according to the present invention, it is preferable that the unidirectionally oriented reinforcing fibers are not localized in specific positions in the tape-shaped prepreg, but substantially uniformly distributed in directions perpendicular to the orientation direction of the reinforcing fibers, and it is also preferable that the gaps among the unidirectionally oriented reinforcing fibers are filled with the thermoplastic resin composition. That is, for the tape-shaped prepreg according to the present invention, it is preferable that the unidirectionally oriented reinforcing fibers are impregnated with the thermoplastic resin composition.

To produce a tape-shaped prepreg containing unidirectionally oriented reinforcing fibers and a thermoplastic resin composition by impregnating the reinforcing fibers with the thermoplastic resin composition, good methods include the molten resin impregnation method, powder impregnation method, film impregnation method, and commingle impregnation method. For the present invention, the method to be used for performing impregnation is not particularly limited, but the molten resin impregnation method is preferred because it does not require preliminary processing of the thermoplastic resin composition. More preferable production methods will be described later.

Examples of the reinforcing fibers to be used in the tape-shaped prepreg according to the present invention include, but not particularly limited to, carbon fibers, metal fibers, organic fibers, and inorganic fibers, which may be used in combination.

Examples of the carbon fibers include polyacrylonitrile based carbon fibers (hereinafter occasionally abbreviated as PAN), pitch based carbon fibers, cellulose based carbon fibers, vapor grown carbon fibers, and graphitized forms of these fibers. Of these, the PAN based carbon fibers are carbon fibers produced by using polyacrylonitrile fibers as raw material. The pitch based carbon fibers are carbon fibers produced by using petroleum tar or petroleum pitch as raw material. The cellulose based carbon fibers are carbon fibers produced by using viscose rayon, cellulose acetate or the like as raw material. The vapor grown carbon fibers are carbon fibers produced by using a hydrocarbon or the like as raw material. Of these carbon fibers, PAN based carbon fibers are preferably used because of having an excellent balance between strength and elastic modulus.

Examples of the metal fibers include fibers of metals such as iron, gold, silver, copper, aluminum, brass, and stainless steel.

Examples of the organic fibers include fibers of organic materials such as aramid fibers, polyphenylene sulfide fibers, polyester fibers, polyamide fibers and polyethylene fibers. Examples of the aramid fibers include para-aramid fibers, which have high strength and elastic modulus, and meta-aramid fibers, which have high flame retardancy and long-term heat resistance. Examples of the para-aramid fibers include polyparaphenylene terephthalamide fibers and copolyparaphenylene-3,4'-oxydiphenylene terephthalamide fibers, and examples of the meta-aramid fibers include polymetaphenylene isophthalamide fibers. As the aramid fibers, para-aramid fibers, which are higher in elastic modulus than meta-aramid fibers, are used preferably.

Examples of the inorganic fibers include fibers of inorganic materials such as glass, basalt, silicon carbides, and silicon nitrides. Examples of the glass fibers include E-glass fibers (for electric applications), C-glass fibers (for anti-corrosion applications), S-glass fibers, and T-glass fibers (high strength and high elastic modulus), and any of these fibers may be useful. The basalt fibers are fibers obtained by processing basalt, which is a mineral, into fibers, and have extremely high heat resistance. In general, basalt contains 9 to 25 mass % of FeO or $FeO_2$, which are iron based compounds, and 1 to 6 mass % of TiO or $TiO_2$, which are titanium based compounds, and it is possible to process basalt into fibers after increasing the contents of these components while they are in molten states.

For the tape-shaped prepreg according to the present invention, it is preferable to use, as the reinforcing fiber, one or a combination of a plurality of reinforcing fibers selected from the group consisting of carbon fiber, glass fiber, basalt fiber, and aramid fiber. In the case where only one type of reinforcing fiber is to be used, it is particularly preferable to adopt the carbon fiber, among others, because it can work efficiently in exhibiting good mechanical properties such as lightness and strength. In the case where a plurality of different types of reinforcing fibers are to be used in combination, the combined use of these fibers is expected to have synergetic effects. If carbon fibers and glass fibers are used in combination, for example, it is possible to achieve both increased reinforcement brought about by the use of carbon fibers and reduced cost brought about by the use of inexpensive glass fibers.

In the tape-shaped prepreg according to the present invention, the reinforcing fibers are usually in the form of a single or a plurality of reinforcing fiber bundles, each formed by bundling a large number of monofilaments. The total number of filaments (the number of monofilaments) in the reinforcing fibers contained in the single or a plurality of arranged reinforcing fiber bundles is preferably from 1,000 to 2,500,000 per tape-shaped prepreg according to the present invention. From the viewpoint of productivity, the total number of filaments in the reinforcing fibers in the tape-shaped prepreg according to the present invention is more preferably from 1,000 to 1,000,000, still more preferably from 1,000 to 600,000, and particularly preferably from 1,000 to 300,000. The range may be between any of the upper limits and the lower limit. An appropriate upper limit of the total number of filaments in the reinforcing fibers is selected, taking into account the balance with dispersibility and handleability so that suitable degrees of productivity, dispersibility and handleability will be maintained.

For the tape-shaped prepreg according to the present invention, it is preferable for the reinforcing fibers to have an average monofilament diameter of 5 to 10 μm, more preferably 6 to 8 μm. The range may be between either of the upper limits and either of the lower limits.

It is also preferable to use reinforcing fibers having a tensile strength of 3,000 to 6,000 MPa. The tensile strength of reinforcing fibers referred to herein is calculated on the basis of monofilaments as seen in the following equation:

tensile strength (MPa) of reinforcing fibers=strength of monofilaments (N)/cross-sectional area (mm$^2$) of monofilaments.

The reinforcing fibers may be surface-treated with a sizing agent in order to improve adhesion, overall composite properties, and higher-order processability. The sizing agent is preferably one prepared by mixing appropriate components such as bisphenol type epoxy compound, linear low-molecular-weight epoxy compound, polyethylene glycol, polyurethane, polyester, emulsifying agent, and surfactant for the purpose of adjusting the viscosity, improving the abrasion resistance, improving the fluffing resistance, improving the sizing property, improving the higher-order processability, etc.

The means to be used for applying the sizing agent is not particularly limited, but good examples include a method in which the reinforcing fibers are immersed in a sizing liquid using a roller, a method in which the reinforcing fibers are brought into contact with a roller that carries a sizing liquid, and a method in which mist of a sizing liquid is sprayed to the reinforcing fibers. Either a batch type or a continuous type application technique will be useful, but the use of a continuous type technique is preferable because a higher productivity and a lower variation can be realized. In this step, it is preferable that the sizing liquid concentration, temperature, yarn tension and the like are controlled so that the effective ingredient(s) of the sizing agent will be deposited uniformly at a deposition rate in an appropriate range relative to the quantity of the reinforcing fibers. Furthermore, when applying the sizing agent, it is more preferable to shake the reinforcing fibers by ultrasonic waves.

The thermoplastic resin to be contained in the thermoplastic resin composition in the tape-shaped prepreg according to the present invention is not particularly limited, as long as it is a thermoplastic resin, and examples thereof include polypropylene, polyethylene, polystyrene, polyvinyl chloride, polyvinyl acetate, ABS resins, polyethylene terephthalate, polybutylene terephthalate, polyamides, polyamideimides, polyacetals, polycarbonates, modified polyphenylene oxide, polyvinyl alcohol, polyalkylene oxides, polysulfones, polyphenylene sulfide, polyarylates, polyetherimide, polyether ether ketone, polyethersulfone, polyimides, polymethyl methacrylate, and polysulfones.

In particular, the thermoplastic resin to be contained in the thermoplastic resin composition in the tape-shaped prepreg according to the present invention is preferably a polyamide resin since the use of a polyamide resin makes it possible to obtain a tape-shaped prepreg excellent in physical properties such as heat resistance, strength, and rigidity.

Here, the polyamide resin referred to above is a polyamide containing, as main constituent components, an amino acid, a lactam, or a diamine and dicarboxylic acid. Representative examples of the main constituent components include amino acids such as 6-aminocaproic acid, 11-aminoundecanoic acid, 12-aminododecanoic acid, and p-aminomethyl benzoic acid; lactams such as ε-caprolactam and ω-laurolactam; aliphatic, alicyclic, and aromatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; and aliphatic, alicyclic and aromatic dicarboxylic acids such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, 5-sodium sulfoisophthalic acid, 2,6-naphthalenedicarboxylic acid, hexahydroterephthalic acid and hexahydroisophthalic acid; and nylon homopolymers or copolymers derived from these raw materials can be used singly or as a mixture thereof for the tape-shaped prepreg according to the present invention. It should be noted that for the tape-shaped prepreg described herein, the polyamide resin is specified on the basis of the raw materials (amino acid, lactam, or diamine and dicarboxylic acid), but this is only for the purpose of identifying the structural feature of the polymer in view of the fact that it is difficult to express the structure resulting from a combination of a plurality thereof. Therefore, such a description is not intended to place limitations on raw materials or eliminate substances produced from other raw materials (the same applies hereafter).

Specific examples of polyamide resins particularly useful as the thermoplastic resin to be contained in the thermoplastic resin composition in the tape-shaped prepreg according to the present invention include polycaproamide (Nylon 6), polyhexamethylene adipamide (Nylon 66), polytetramethylene adipamide (Nylon 46), polyhexamethylene sebacamide (Nylon 610), polyhexamethylene dodecamide (Nylon 612), polyundecanamide (Nylon 11), polydodecanamide (Nylon 12), polycaproamide/polyhexamethylene adipamide copolymer (Nylon 6/66), polycaproamide/polyhexamethylene terephthalamide copolymer (Nylon 6/6T), polyhexamethylene adipamide/polyhexamethylene terephthalamide copolymer (Nylon 66/6T), polyhexamethylene adipamide/polyhexamethylene isophthalamide/polycaproamide copolymer (Nylon 66/6I/6), polyhexamethylene adipamide/polyhexamethylene isophthalamide copolymer (Nylon 66/6I), polyhexamethylene terephthalamide/polyhexamethylene isophthalamide copolymer (Nylon 6T/6I), polyhexamethylene terephthalamide/polydodecanamide copolymer (Nylon 6T/12), polyhexamethylene adipamide/polyhexamethylene terephthalamide/polyhexamethylene isophthalamide copolymer (Nylon 66/6T/6I), polyxylylene adipamide (Nylon XD6), polyhexamethylene terephthalamide/poly-2-methylpentamethylene terephthalamide copolymer (Nylon 6T/M5T), and polynonamethylene terephthalamide (Nylon 9T), as well as mixtures and copolymers thereof, of which preferred is polyamide 6, which is high in ability to impregnate reinforcing fibers and handleability.

For the present invention, the warpage rate of a tape-shaped prepreg is measured by the procedure specified in (i) to (iii) below:

(i) Place a test piece of the tape-shaped prepreg having a length of 100 mm in the fiber orientation direction on a plane in such manner that the end portions curl upward. In this step, a 100 mm sample may be prepared by cutting a long tape, but care should be taken to prevent the sample from curling while being cut. It is necessary to prevent the tape-shaped prepreg from curling up or down unevenly on the plane. It is preferable to place it on a hard plane, and it is also preferable to place it on a smooth plane.

(ii) Measure the vertical distance from the highest position at the right end of the curled tape to the plane, which is denoted by a, and the vertical distance from the highest position at the left end to the plane, which is denoted by b, and calculate the arithmetic average (arithmetical mean) of a and b, which is defined as the warpage distance.

(iii) Calculate the warpage rate by the following equation:

warpage rate (%)=warpage distance [mm]/100 [mm]×100.

The warpage rate of the tape-shaped prepreg according to the present invention is 5% or less, preferably 3% or less. If the warpage rate is more than 5%, it will be difficult to shape the tape-shaped prepreg into a desired form when used to produce a laminate or reinforce other members, leading to a low handleability during molding. Although it is practically difficult to eliminate warp completely, a sample of the present invention being examined by the measuring method used for the present invention are pressed down by its own weight to allow both edges of the sample of the tape-shaped prepreg to come in full contact with the smooth surface in some cases, and therefore, the lower limit of the warpage rate for the present invention is 0%.

For the tape-shaped prepreg according to the present invention, the surface roughness (Ra) in the perpendicular direction to the reinforcing fibers as measured according to JIS B 0601: 2013 is 10 μm or less, more preferably 8.0 μm or less, and still more preferably 6.3 μm or less. If the surface roughness (Ra) is more than 10 μm, the prepreg will be low in handleability when used to produce a laminate or reinforce other members, leading to a low productivity. Furthermore, since it is practically difficult in some cases to decrease the surface roughness to zero, a lower limit of 0.1 μm or more will be likely, but a prepreg with a lower limit of 0.4 μm or more can serve for practical uses or can serve even in a more preferable manner in some cases. From this viewpoint, it is more preferably 0.8 μm or more. If it is less than 0.1 μm, only poor adhesion can be achieved when reinforcing other members. The range may be between any of the upper limits and any of the lower limits.

To prepare a tape-shaped prepreg having a warpage rate and a surface roughness (Ra) controlled at 5% or less and 0.1 to 10 μm, respectively, a good method is to appropriately adjust the Pc/Qp ratio [W·s/m$^3$], wherein Pc [W] is the heat absorbing capability of the cooling mechanism and Qp [m$^3$/s] is the volume of the prepreg passing through the cooling mechanism per second.

The thickness of the tape-shaped prepreg according to the present invention is preferably 0.05 to 15 mm, more preferably 0.2 to 15 mm, and still more preferably 0.2 to 5 mm. The range may be between any of the upper limits and any of the lower limits. The required number of stacked plies will decrease to ensure an increased productivity and enhanced reinforcing effect if the thickness of the tape-shaped prepreg is 0.05 mm or more, whereas the prepreg will be high in handleability when handled to produce a laminate or reinforce other members if the thickness of the tape-shaped prepreg is 15 mm or less. The thickness of the tape-shaped prepreg can be controlled by changing the gap size of the nozzle located near the outlet, i.e., downstream, of the tank.

For the present invention, the thickness of the tape-shaped prepreg is defined as the value obtained by measuring the thickness at appropriately selected 15 or more different points of the tape-shaped prepreg and calculating the arithmetic average of the measurements.

The fiber volume content in 100% by volume of the tape-shaped prepreg according to the present invention is preferably from 30% to 70% by volume, more preferably from 35% to 65% by volume, and still more preferably from 40% to 60% by volume. The range may be between any of the upper limits and any of the lower limits. A fiber volume content of 30% by volume or more allows the tape-shaped prepreg to have excellent mechanical properties and reinforcing effect. A fiber volume content of 70% by volume or less allows the thermoplastic resin composition to work effectively in impregnating the reinforcing fibers during the tape-shaped prepreg production process.

The void content in 100% by volume of the tape-shaped prepreg according to the present invention is preferably 5% by volume or less, more preferably 4% by volume or less, and still more preferably 3% by volume or less. A void content of 5% by volume or less allows the tape-shaped prepreg to have excellent mechanical properties and reinforcing effect. A lower void content of the tape-shaped prepreg is more desirable, and thus the lower limit of the void content is 0% by volume. A good void content measuring method will be described below in Examples.

The void content can be adjusted to 5% by volume or less by such means as reducing the melt viscosity of the thermoplastic resin composition used for impregnation and increasing the pressure to be applied during impregnation.

It is preferable for the tape-shaped prepreg according to the present invention to give a waviness curve having a maximum cross-sectional height (Wt) of 80 μm or less, more preferably 60 μm or less, as measured according to JIS B 0601: 2013. If the waviness curve has a maximum cross-sectional height (Wt) of 80 μm or less, it will be easy to shape the tape-shaped prepreg into a desired form when used to produce a laminate or reinforce other members, leading to a high handleability during molding. It is preferable for the waviness curve to have as low a maximum cross-sectional height (Wt) as possible, but it is practically difficult in some cases to decrease it to zero, and therefore, its lower limit is normally 1 μm.

The method for producing the tape-shaped prepreg according to a present invention include the steps of putting a thermoplastic resin composition in a molten state into a tank having an inlet portion and an outlet portion, introducing a plurality of continuous reinforcing fibers from the inlet portion of the tank so that they are impregnated with the resin composition, making the thermoplastic resin composition and the plurality of continuous reinforcing fibers exit through the outlet portion of the tank and then pass through a cooling mechanism to produce a tape-shaped prepreg.

This method for producing a tape-shaped prepreg meets the following relation (A) between Pc and Qp, wherein Pc [W] is the heat absorbing capacity of the cooling mechanism and Qp [m$^3$/s] is the volume of the tape-shaped prepreg passing through the cooling mechanism in one second:

$$2.8\times10^8 \leq Pc/Qp \leq 23.2\times10^8 \qquad (A)$$

The adoption of this constitution allows the tape-shaped prepreg to be reliably cooled and solidified, thereby permitting the control of the shrinkage of the thermoplastic resin composition and also permitting the production of the tape-shaped prepreg having high surface smoothness and dimensional accuracy with high productivity.

The method for producing a tape-shaped prepreg containing a plurality of continuous reinforcing fibers and a thermoplastic resin according to the present invention includes a step for passing the plurality of continuous reinforcing fibers through a tank containing the thermoplastic resin. Examples of such a method that includes a step for passing a plurality of continuous reinforcing fibers through a tank containing a thermoplastic resin include the molten resin impregnation method, powder impregnation method, and commingle impregnation method. Of these, the molten resin impregnation method is preferred for the present invention because it does not require preliminary processing of the thermoplastic resin composition.

An embodiment of the present invention is described below with reference to drawings.

FIG. 1 shows a tape-shaped prepreg production method according to an embodiment of the present invention, in which 100 denotes the entire setup for producing a tape-shaped prepreg. In this embodiment, a plurality of bobbins 102, each having a continuous reinforcing fiber 101 wound thereon, are provided and the plurality of continuous reinforcing fibers 101 are sent out from the plurality of bobbins 102 while being guided by a yarn guide 103. The plurality of continuous reinforcing fibers 101 sent out continuously are then supplied with a molten thermoplastic resin composition 107 that is fed at a constant feeding rate from a feeder 105 filled with the thermoplastic resin and pass through a tank 104 having an inlet portion and an outlet portion. In this manner, the plurality of continuous reinforcing fibers 101 introduced from the inlet portion of the tank can be impregnated with the thermoplastic resin composition 107 in a molten state while passing through the tank 104. The plurality of continuous reinforcing fibers 101 impregnated with the thermoplastic resin composition 107 are continuously pulled by the pulling force of the pull rolls 109, thereby passing through the outlet portion of the tank 104 and passing through a cooling mechanism 108 in which the thermoplastic resin composition 107 is cooled and solidified to form a tape-shaped prepreg 110 composed of the thermoplastic resin composition 107 and the continuous reinforcing fibers 101. The resulting tape-shaped prepreg 110 is preferably wound up on a winding roll 111 to form a roll.

The width and thickness of the tape-shaped prepreg 110 are defined by the size of the outlet portion of the tank 104, and therefore, the size of the tape-shaped prepreg 110 can be controlled by changing the outlet size of the tank 104. It should be noted that the thermoplastic resin composition 107 filling the tank 104 may completely pass through the tank 104 together with the plurality of continuous reinforcing fibers 101, but in the case where the thermoplastic resin composition 107 in the tank 104 does not completely pass through it together with the plurality of continuous reinforcing fibers 101, the remaining part of the thermoplastic resin composition 107 left in the tank 104 can be discharged through the discharge port 106.

In the method for producing a tape-shaped prepreg according to the present invention, it is preferable that the plurality of continuous reinforcing fibers are oriented unidirectionally in the traveling direction while the continuous reinforcing fibers pass through the tank. This allows the continuous reinforcing fibers in the resulting tape-shaped prepreg to be oriented in one direction. Specifically, for the tape-shaped prepreg including a plurality of continuous reinforcing fibers and a thermoplastic resin obtained by the tape-shaped prepreg production method according to the present invention, the orientation direction of the plurality of continuous reinforcing fibers is not particularly limited, but it is preferable that they are oriented in one direction because high workability is maintained during the production of the tape-shaped prepreg.

For the method for producing a tape-shaped prepreg according to the present invention, it is preferable to use one or a plurality of roller-shaped members as cooling members of the cooling mechanism 108. If roller-shaped members are used as cooling members of the cooling mechanism 108, it is preferable because friction does not occur between the rollers and accordingly, the tape-shaped prepreg is less likely to be damaged.

Examples in which roller-shaped members are used as cooling members of the cooling mechanism 108 will be described below with reference to FIGS. 2 and 3.

FIG. 2 shows one embodiment of the cooling mechanism 108 illustrated in FIG. 1 and gives a schematic diagram of a cooling mechanism in which the tape-shaped prepreg 201 is held by roller-shaped members. Hereinafter, cooling mechanisms of this type will be occasionally referred to as cooling mechanisms of a roller-shaped member type tape-shaped prepreg holding structure. The cooling mechanism 200 has a roller-shaped member type tape-shaped prepreg holding structure that contains only one roller-shaped member 202. After passing through the outlet of the tank 104, the tape-shaped prepreg 201 is allowed to travel with one side kept in contact with the roller-shaped member 202 so that the tape-shaped prepreg 201 is cooled and solidified. The cooling mechanism 203 has a roller-shaped member type tape-shaped prepreg holding structure that contains two roller-shaped members 202. After passing through the outlet of the tank 104, the tape-shaped prepreg 201 is allowed to travel with each side kept in contact with either of the roller-shaped members 202 so that the tape-shaped prepreg 201 is cooled and solidified. The cooling mechanism 204 has a roller-shaped member type tape-shaped prepreg holding structure that contains four roller-shaped members 202, in which the tape-shaped prepreg 201 is cooled in the same way as in 203. Here, the temperature of the roller-shaped members contained in the cooling mechanism is controlled by, for example, passing water through them.

FIG. 3 shows another embodiment of the cooling mechanism 108 illustrated in FIG. 1 and gives a schematic diagram of a cooling mechanism of a structure that contains one pair or a plurality of pairs of opposed roller-shaped members, each pair consisting of a roller-shaped member and another roller-shaped member located opposite thereto in the cooling mechanism, so that the tape-shaped prepreg can be interposed between them. Hereinafter, cooling mechanisms of this type will be occasionally referred to as cooling mechanisms of a roller-shaped member type tape-shaped prepreg interposing structure. The cooling mechanism 300 has a roller-shaped member type tape-shaped prepreg interposing structure that contains two roller-shaped members 302. After passing through the outlet of the tank 104, the tape-shaped prepreg 301 is allowed to be interposed and passed between the roller-shaped members 302 with the two sides kept in contact with them so that the tape-shaped prepreg 301 is cooled and solidified. The cooling mechanism 303 has a roller-shaped member type tape-shaped prepreg interposing structure that contains four roller-shaped members 302, in which the tape-shaped prepreg 301 is cooled in the same way as in 300.

For the method for producing a tape-shaped prepreg according to the present invention, it is also preferable to use one or a plurality of plate-shaped members as cooling members of the cooling mechanism 108. If plate-shaped members are used as cooling members of the cooling mechanism 108, it is preferable because the time of contact between the plate-shaped cooling members and the tape-shaped prepreg will be longer to realize more efficient cooling.

Examples in which plate-shaped members are used as cooling members of the cooling mechanism 108 will be described below with reference to FIG. 4.

Figure 4:
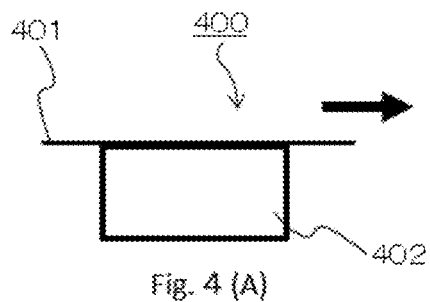
FIG. 4 This is a schematic diagram showing an example of a cooling mechanism of a tape-shaped prepreg contacting structure of the plate-shaped member type.
Figure 4:
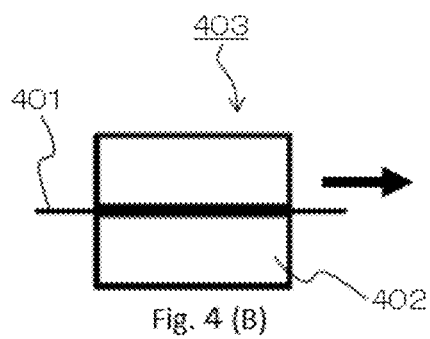
Figure 4:
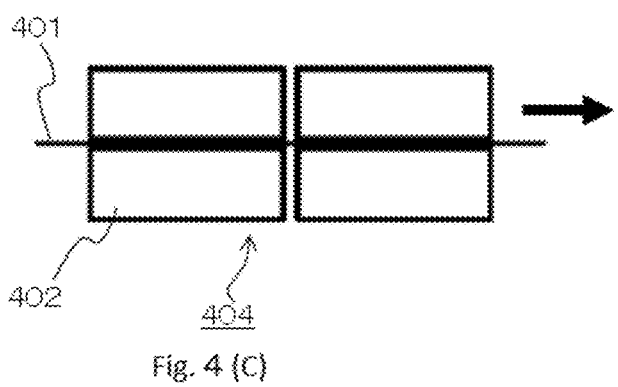

FIG. 4 shows another embodiment of the cooling mechanism 108 illustrated in FIG. 1 and gives a schematic diagram of a cooling mechanism in which the tape-shaped prepreg 401 is in contact with plate-shaped members. Hereinafter, cooling mechanisms of this type will be occasionally referred to as cooling mechanisms of a plate-shaped member type tape-shaped prepreg contact structure. The cooling mechanism 400 has a plate-shaped member type tape-shaped prepreg contact structure that contains only one plate-shaped member 402. After passing through the outlet of the tank 104, the tape-shaped prepreg 401 is allowed to travel with one side kept in contact with the plate-shaped member 402 so that the tape-shaped prepreg 401 is cooled and solidified. The cooling mechanism 403 has a plate-shaped member type tape-shaped prepreg contact structure that contains two plate-shaped members 402. After passing through the outlet of the tank 104, the tape-shaped prepreg 401 is allowed to travel between the plate-shaped members 402 with the two sides kept in contact with them so that the tape-shaped prepreg 401 is cooled and solidified. The cooling mechanism 404 has a plate-shaped member tape-shaped prepreg contact structure that contains four plate-shaped members 402, in which the tape-shaped prepreg 401 is cooled in the same way as in 403.

For the method for producing a tape-shaped prepreg according to the present invention, it is also preferable to use both one or a plurality of roller-shaped members and one or a plurality of plate-shaped members as cooling members of the cooling mechanism 108. If roller-shaped members and plate-shaped members are used in combination as cooling members of the cooling mechanism 108, it is preferable because they serve to simultaneously realize the two good effects of a decreased friction achieved by the rollers and a lengthened time of contact with the tape-shaped prepreg achieved by the plate-shaped cooling members.

Examples in which a roller-shaped member(s) and a plate-shaped member(s) are used in combination as cooling members of the cooling mechanism 108 will be described below with reference to FIG. 5.

Figure 5:
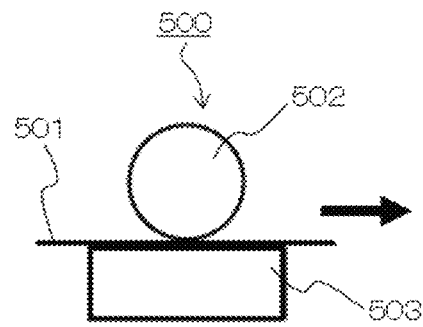
FIG. 5 This is a schematic diagram showing an example of a cooling mechanism of a tape-shaped prepreg interposing structure of the combined roller-shaped member and plate-shaped member type.
Figure 5:
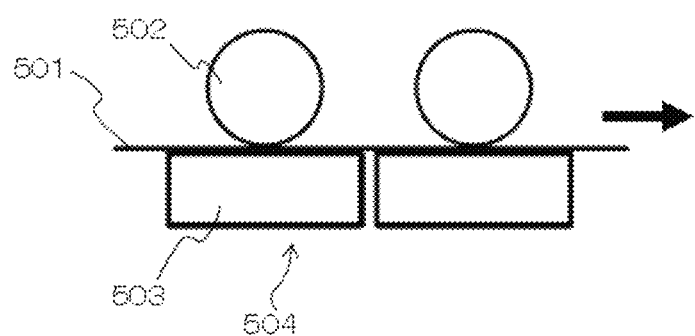

FIG. 5 shows an embodiment of the cooling mechanism 108 illustrated in FIG. 1 and gives a schematic diagram of a cooling mechanism having a structure that contains a roller-shaped member(s) located opposite to a plate-shaped member(s) in the cooling mechanism 108 so that the tape-shaped prepreg is interposed between the roller-shaped member(s) and the plate-shaped member(s) of the cooling mechanism. Hereinafter, a cooling mechanism of this type will be occasionally referred to as a cooling mechanism of the combined roller-shaped member and plate-shaped member type tape-shaped prepreg interposing structure. The cooling mechanism 500 illustrated therein contains one roller-shaped member 502 and one plate-shaped member 503. After passing through the outlet of the tank 104, the tape-shaped prepreg 501 is allowed to be interposed and passed between the roller-shaped member 502 and the plate-shaped member 503 with the two sides kept in contact with them so that the tape-shaped prepreg 501 is cooled and solidified. The cooling mechanism 504 illustrated therein contains two roller-shaped members 502 and two plate-shaped members 503, in which the tape-shaped prepreg 501 is cooled in the same way as in 500.

It is preferable for the method for producing a tape-shaped prepreg according to the present invention to meet the following relation (A) between Pc and Qp, wherein Pc [W] is the heat absorbing capacity of the cooling mechanism and Qp [m³/s] is the volume of the tape-shaped prepreg passing through the cooling mechanism in one second:

$$2.8 \times 10^8 \leq Pc/Qp \leq 23.2 \times 10^8 \quad \text{(A)}$$

More specifically, the value of $Pc/Qp$ [W·s/m³] is in the range from $2.8 \times 10^8$ to $23.2 \times 10^8$, more preferably from $4.7 \times 10^8$ to $20.4 \times 10^8$, and still more preferably from $5.6 \times 10^8$ to $19.3 \times 10^8$. The range may be between any of the upper limits and any of the lower limits.

A large Pc/Qp value means that the heat absorbing capacity of the cooling mechanism is large relative to the volume of the tape-shaped prepreg passing through the cooling mechanism in one second to allow the tape-shaped prepreg to be cooled and solidified reliably, but if this Pc/Qp value exceeds $23.2 \times 10^8$, a cooling mechanism having an unnecessarily large heat absorbing capacity will be required, leading to a facility of an increased size and an increased manufacturing cost. On the other hand, a small Pc/Qp value means that heat absorbing capacity of the cooling mechanism is so small relative to the volume of the tape-shaped prepreg passing through the cooling mechanism in one second that the tape-shaped prepreg cannot be cooled and solidified sufficiently, and if this Pc/Qp value is less than $2.8 \times 10^8$, the tape-shaped prepreg will continue to cool and solidify even after passing through the cooling mechanism, consequently failing to obtain a tape-shaped prepreg of desired dimensions or resulting in a tape-shaped prepreg having a low surface smoothness.

For the method for producing a tape-shaped prepreg according to the present invention, regardless of the number of cooling members constituting the cooling mechanism, the heat absorbing capacity Pc[W] of the entire cooling mechanism is preferably 1.2 to $3.9 \times 10^5$, more preferably 3.9 to $2.7 \times 10^5$, and even more preferably 6.9 to $1.6 \times 10^5$. The range may be between any of the upper limits and any of the lower limits. Here, the cooling mechanism is installed for the purpose of cooling the tape-shaped prepreg, which is heated and produced by impregnating continuous reinforcing fibers with a thermoplastic resin in the tank and then being pulled out from the outlet portion of the tank, and in the case where there is no system intended for adjusting the temperature of the mechanism so that the temperature of the prepreg is allowed to decrease naturally as it passes through the mechanism, it is regarded that there is no such a cooling mechanism as referred to herein. When Pc is 1.2 or more, the cooling mechanism will have a high heat absorbing capacity, making it possible to obtain a tape-shaped prepreg having a high dimensional accuracy and surface smoothness. When Pc is $3.9 \times 10^5$ or less, it is possible to reduce the size of the cooling mechanism and simplify its structure. In terms of the heat absorbing capacity, it is preferable for the cooling mechanism to be designed on the basis of the type of the thermoplastic resin to be used and the temperature conditions and also on the basis of the volume of the tape-shaped prepreg passing through the cooling mechanism per second to meet the purpose of the present invention.

For the method for producing a tape-shaped prepreg according to the present invention, the volume of the prepreg passing through the cooling mechanism per second Qp [m³/s] is preferably $4.2 \times 10^{-9}$ to $1.7 \times 10^{-4}$, more preferably $8.3 \times 10^{-9}$ to $1.3 \times 10^{-4}$, and still more preferably $1.3 \times 10^{-8}$ to $8.3 \times 10^{-5}$. The range may be between any of the upper limits and any of the lower limits. When Qp is $1.7 \times 10^{-4}$ or less, the heat absorbing capacity of the cooling mechanism can be reduced, making it easy to obtain a tape-shaped prepreg with a high dimensional accuracy. When Qp is $4.2 \times 10^{-9}$ or more, on the other hand, a high productivity can be ensured.

The volume of the tape-shaped prepreg passing through the cooling mechanism in one second Qp [m³/s] can be calculated as the product of the speed of the tape-shaped prepreg passing through the cooling mechanism [m/s] multiplied by the outlet size (area [m²]) of the tank.

For the method for producing a tape-shaped prepreg of the present invention, the cross-sectional shape of the cooling member contained in the cooling mechanism is not particularly limited, and it may be a roller shape or a plate shape. For the cooling members of a cooling mechanism, furthermore, there is no limitation on the size, number, and arrangement. The cooling mechanism may have roller-shaped members alone; the cooling mechanism may have plate-shaped members alone; or the cooling mechanism may have a combination of roller-shaped members and plate-shaped members. When roller-shaped members are used, the roller-shaped members may be supported by bearings etc. to permit spontaneous rotation, or they may be driven to rotate by motors or the like. When roller-shaped members are used, it is expected that even if foreign matter enters the cooling mechanism, such foreign matter will be removed by the rotation of the roller as it passes between them. When plate-shaped members are used, the surface area of each plate on which the tape-shaped prepreg passes is preferably flat, although the edge portion at the plate end from which the tape-shaped prepreg is introduced into the cooling mechanism may have a curved surface or a tapered surface. When plate-shaped members are used, the area of contact of the tape-shaped prepreg with the cooling mechanism will be larger compared with the case where roller-shaped members are used, and accordingly, a high cooling and solidification effect can be realized using a small scale facility.

For the method for producing a tape-shaped prepreg according to the present invention, the cooling members of the cooling mechanism used therefor preferably has an arithmetic average roughness (Ra) of 0.1 to 25.0 μm, more preferably 0.4 to 12.5 μm, and still more preferably 0.8 to 6.3 μm, as measured according to JIS B 0601: 2013, regardless of whether the members have a roller shape or a plate shape. The range may be between any of the upper limits and any of the lower limits. The cooling members of a cooling mechanism and the tape-shaped prepreg will have nearly equal Ra values or the Ra value of the tape-shaped prepreg will be 10 to 20 times as large as the Ra value of the cooling members of the cooling mechanism if the cooling mechanism has an appropriate degree of heat absorbing capacity and also if there is an appropriate degree of frictional force acting between the cooling mechanism and the tape-shaped prepreg that is passing through the cooling mechanism, and accordingly, it is preferable for the cooling members of the cooling mechanism to have an appropriately selected Ra value to suit the desired Ra value of the tape-shaped prepreg.

For the method for producing a tape-shaped prepreg according to the present invention, it is preferable that the cooling members of the cooling mechanism used has a structure that is temperature-adjustable. If a plurality of cooling members exist in the cooling mechanism, it is preferable that each cooling member is temperature-adjustable independently, regardless of whether roller-shaped members or plate-shaped members are used in the cooling mechanism. The method and means to be used for adjusting the temperature of the cooling members is not particularly limited, and good examples include the method of flowing a fluid through the interior of the cooling members, the method of applying a fluid to the cooling members from the outside of the cooling members, and the method of fixing a device working as a heat source in each cooling member. The method of flowing a fluid through the interior of the cooling members is preferred because the structure of the cooling members can be so simple that temperature adjustment can be performed efficiently. The fluid to be flowed through the interior of the cooling members of the cooling mechanism is not particularly limited, and examples thereof include water, steam, air, oil, and antifreeze such as ethylene glycol.

For the fluid flow formed in the interior of the cooling members of the cooling mechanism, the cross-sectional shape is not particularly limited regardless of whether roller-shaped or plate-shaped members are used, and it may be circular or rectangular. If the fluid flow formed in the interior of the cooling members has a circular cross section, it is preferable because the structure of the cooling members can be simplified.

For the fluid flowing through the interior of the cooling members of the cooling mechanism and for the fluid to be applied to the cooling members from the outside of the cooling members, the flow rate is preferably as larger as possible to allow the heat transferred from the tape-shaped prepreg to the cooling mechanism to be exchanged efficiently, although it is preferably adjusted so that the Pc/Qp ratio is stay within the range set forth for the present invention while meeting the constraint requirements of the facility.

For the cooling mechanism used for the method for producing a tape-shaped prepreg according to the present invention, the cooling capacity depends on the size, number, set temperature, fluid flow rate of the cooling members of the cooling mechanism, and therefore, it is preferably designed so that a desired heat absorbing capacity is ensured while meeting constraint requirements such as the specifications and space of the facility. For the size of the cooling members, in particular, the contact length between the tape-shaped prepreg and the cooling members is nearly proportional to the cooling capacity, and it is desirable to design them based on calculations of the size to suit the cooling capacity.

The shapes of the cooling members of the cooling mechanism to be used for the method for producing a tape-shaped prepreg according to the present invention are not particularly limited, but in the case of using a cooling mechanism having a structure in which a cooling member is located opposite to another cooling member to form a pairing shape, with the tape-shaped prepreg sandwiched between them, so that the tape-shaped prepreg is interposed between the cooling members that form a pairing shape, the structure is preferably one in which the distance between the cooling members sandwiching the tape-shaped prepreg can be adjusted as desired. The method to be used for setting the distance between the cooling members as desired is not particularly limited, and examples include the method of adjusting the position of the top or bottom dead center of an air cylinder or a hydraulic cylinder to a desired distance and the method of interposing a shim plate between the cooling members. If the distance between the cooling members can be set as desired, there are advantages such as high workability at the time of production preparation and adjustability of the degree of contact between the cooling members of the cooling mechanism and the tape-shaped prepreg. If the distance between the cooling members is too narrow, the tape-shaped prepreg will not be able to pass through the cooling mechanism. If the distance between the cooling members is too wide, the tape-shaped prepreg may fail to be in contact with the cooling mechanism and the tape-shaped prepreg will not cool and solidify in some cases.

The shapes of the cooling members of the cooling mechanism to be used for the method for producing a tape-shaped prepreg according to the present invention are not particularly limited, but in the case of using a cooling mechanism having a structure in which a cooling member is located opposite to another cooling member to form a pairing shape, with the tape-shaped prepreg sandwiched between them, so that the tape-shaped prepreg is interposed between a pair of cooling members, the structure is preferably one in which the force applied to fix the cooling members at specified positions with a specified distance maintained between the cooling members can be adjusted as desired. The method to be used for fixing the cooling members at specified positions is not particularly limited, and an appropriate method may be adopted according to the fixing means used. Good examples include the use of an air cylinder or a hydraulic cylinder to grip them and the use of a bolt and a nut to fasten them. In the case where the tape-shaped prepreg is allowed to travel with one side kept in contact with only the roller-shaped member, rather than interposing the tape-shaped prepreg between cooling members of the cooling mechanism, it is also preferable for their structure to be one in which the force applied to fix the cooling members of the cooling mechanism at specified positions can be adjusted as desired. If the force to fix the cooling members can be adjusted as desired, it will be possible to apply a proper load to the tape-shaped prepreg passing through the cooling mechanism to meet the production conditions of the tape-shaped prepreg. If the force to fix the cooling members is too small, there will be problems such as a large reaction force that the tape-shaped prepreg receives while passing through the cooling mechanism, making it impossible for the tape-shaped prepreg to maintain a desired size.

For the method for producing a tape-shaped prepreg according to the present invention, the tape-shaped prepreg passing through the cooling mechanism after exiting the outlet of the tank may be either in a state in which it is continuous in the direction perpendicular to the traveling direction (i.e., only one tape-shaped prepreg is produced by making it travel alone) or in a divided state (i.e., a plurality of tape-shaped prepreg strips are produced by making them travel in parallel simultaneously). When either a tape-shaped prepreg in a continuous form or a tape-shaped prepreg split into strips passes through the cooling mechanism, the surface of each cooling member coming in contact with the tape-shaped prepreg may be either uniform and flat, or irregular depending on the size of the tape-shaped prepreg, regardless of whether the cooling members of the cooling mechanism are roller-shaped or plate-shaped. The tape-shaped prepreg that is continuous in the direction perpendicular to the traveling direction of the tape-shaped prepreg is higher in productivity. The tape-shaped prepreg that is discontinuous in the direction perpendicular to the traveling direction of the tape-shaped prepreg is so higher in dimensional design freedom that they can meet a wide range of dimensional requirements of various cooling members.

EXAMPLES

The present invention will now be described specifically, based on examples and comparative examples, but it should be noted that the present invention is not limited to these examples.

(1) Method for Measurement of Specific Gravity

Measurement of specific gravity was performed using a specific gravity measuring device (ELECTRONIC DENSIMETER SD-200L, manufactured by Alfa Mirage Co., Ltd.).

(2) Methods for Measurement of Fiber Volume Content and Void Content

An about 0.5 g quantity (W1 [g]) of the tape-shaped prepreg is weighed and then left to stand for 120 minutes in a nitrogen gas stream flowing at 50 mL/min in an electric furnace controlled at a temperature of 500° C. so that the thermoplastic resin composition in the tape-shaped prepreg is thermally decomposed completely. Then the resulting material was transferred to a container placed in a dry nitrogen gas stream flowing at 20 L/min and cooled for 15 minutes, followed by weighing the resulting reinforcing fiber (W2 [g]) to determine the amount of the reinforcing fiber. Subsequently, the properties of the sample were calculated from the above measurements by the following equations.

Fiber volume content (%)=(W2 [g]/specific gravity of reinforcing fiber (g/cm$^3$))/(W1 [g]/specific gravity of tape-shaped prepreg (g/cm$^3$))×100

Resin volume content (%)=((W1−W2) [g]/specific gravity of thermoplastic resin composition (g/cm$^3$))/(W1 [g]/specific gravity of tape-shaped prepreg (g/cm$^3$))×100

Void content (%)=100−fiber volume content (%)−resin volume content (%)

(3) Method for Measurement of Thickness

The thickness of a tape-shaped prepreg sample was measured at appropriately selected 15 different points using a micrometer and the arithmetic average of the measurements was calculated to represent the thickness of the tape-shaped prepreg.

(4) Method for measurement of surface roughness (arithmetic average roughness) Using a surface roughness measuring apparatus (Surfcom 480 A, manufactured by Tokyo Seimitsu Co., Ltd.), the surface roughness (arithmetic average roughness (Ra)) of a tape-shaped prepreg sample and the cooling members of the cooling mechanism was measured according to JIS B 0601: 2013.

(5) Method for Measurement of Maximum Cross-Sectional Height in Waviness Curve

Using a surface roughness measuring apparatus (Surfcom 480 A, manufactured by Tokyo Seimitsu Co., Ltd.), the maximum cross-sectional height (Wt) in the waviness curve of a tape-shaped prepreg sample was measured according to JIS B 0601: 2013.

(6) Method for Evaluation for Handleability

Two 300 mm long pieces of a tape-shaped prepreg were welded together along their long sides using a soldering iron, and it was rated as A when the operation was completed easily within 3 mites, rated as B when the operation required careful work and an operation time of 3 minutes or more, and rated as C when the operation involved difficulty. In Examples below, a sample rated as B or higher is judged to be acceptable.

(7) Raw Materials (A) Reinforcing Fiber (a-1) Carbon fiber: Torayca (registered trademark) T700SC-12K-60E (manufactured by Toray Industries, Inc.)

(B) Thermoplastic Resin Composition (b-1) Polyamide 6: Amilan (registered trademark) CM1007 (manufactured by Toray Industries, Inc.), (C) Shape and Number of Cooling Members of Cooling Mechanism (c-1) Roller-Shaped 2 pairs (4 in total) of interposing type cooling members (top and bottom)

(c-2) Plate-Shaped 1 pairs (2 in total) of interposing type cooling members (top and bottom)

Example 1

Using (a-1) as reinforcing fiber and (b-1) as thermoplastic resin composition, a tape-shaped prepreg was produced using a production apparatus shown in FIG. 1.

Bobbins 102 carrying reinforcing fibers 101 wound thereon were set as shown in FIG. 1, and the reinforcing fibers 101 were continuously sent out from the bobbins 102 through the yarn guide 103. The continuously supplied reinforcing fibers 101 were impregnated with a thermoplastic resin composition 107 that is fed at a constant feeding rate from a feeder 105 filled with the thermoplastic resin composition. The reinforcing fibers 101 impregnated with the thermoplastic resin composition 107 in the tank 104 were continuously drawn from a nozzle having a gap with a width of 50 mm and a thickness of 0.30 mm located downstream of the tank 104. Here, the reinforcing fibers 101 were used in such a manner that their total cross-section accounts for 50% of the cross-section of the nozzle gap. The reinforcing fibers 101 pulled by the pull rolls 109 were cooled and solidified as they passed through a cooling mechanism 108, and wound by a winder 111 to provide a tape-shaped prepreg 110 having a fiber volume content of 50 vol %. Here, the shape and number of the cooling members of the cooling mechanism were as described under (c-1). All samples had a surface roughness (Ra) of 0.2 μm. Cooling water was supplied to flow inside (c-1) and the Pc/Qp ratio, wherein Pc [W] is the heat absorbing capacity of the cooling mechanism and Qp [m³/s] is the volume of the tape-shaped prepreg passing through the cooling mechanism in one second, was $5.7 \times 10^8$. The tape-shaped prepreg coming out from the outlet of the tank 104 was cooled as it passed between a pair of roller-shaped cooling members and then passed between another pair of roller-shaped cooling members. Results are shown in Tables 1-1.

Example 2

Except that the nozzle of the tank 104 had a gap thickness of 0.15 mm, the same procedure as in Example 1 was carried out to provide a tape-shaped prepreg 110 having a different thickness. Results are shown in Tables 1-1.

Example 3

Except that the nozzle of the tank 104 had a gap thickness of 0.20 mm, the same procedure as in Example 1 was carried out to provide a tape-shaped prepreg 110 having a different thickness. Results are shown in Tables 1-1.

Example 4

Except that the nozzle of the tank 104 had a gap thickness of 0.50 mm, the same procedure as in Example 1 was carried out to provide a tape-shaped prepreg 110 having a different thickness. Results are shown in Tables 1-1.

Example 5

Except that each roller-shaped cooling member used in the cooling mechanism was a cooling member having a surface roughness (Ra) of 12.0 μm, the same procedure as in Example 1 was carried out to provide a tape-shaped prepreg 110 having a different surface roughness. Results are shown in Tables 1-1.

Example 6

Except that the nozzle of the tank 104 had a gap thickness of 0.20 mm, the same procedure as in Example 5 was carried out to provide a tape-shaped prepreg 110 having a different thickness. Results are shown in Tables 1-1.

Example 7

Except that the nozzle of the tank 104 had a gap thickness of 0.50 mm, the same procedure as in Example 5 was carried out to provide a tape-shaped prepreg 110 having a different thickness. Results are shown in Tables 1-1.

Example 8

Except that the amount of the reinforcing fibers 101 used was such that their total cross-section accounted for 40% of the cross-section of the nozzle gap in the tank 104, the same procedure as in Example 1 was carried out to provide a tape-shaped prepreg 110 having a different fiber volume content. Results are shown in Tables 1-2.

Example 9

Except that the amount of the reinforcing fibers 101 used was such that their total cross-section accounted for 60% of the cross-section of the nozzle gap in the tank 104, the same procedure as in Example 1 was carried out to provide a tape-shaped prepreg 110 having a different fiber volume content. Results are shown in Tables 1-2.

Example 10

Except that the production rate was twice that in Example 1, the same procedure as in Example 1 was carried out to provide a tape-shaped prepreg 110 having a different void content. Results are shown in Tables 1-2.

Example 11

Except that the Pc/Qp ratio was $18.1 \times 10^8$, the same procedure as in Example 1 was carried out to provide a tape-shaped prepreg 110. Results are shown in Tables 1-2.

Example 12

Except that the nozzle of the tank 104 had a gap thickness of 0.15 mm, the same procedure as in Example 11 was carried out to provide a tape-shaped prepreg 110 having a different thickness. Results are shown in Tables 1-2.

Example 13

Except that the nozzle of the tank 104 had a gap width of 10 mm and a gap thickness of 0.05 mm, the same procedure as in Example 1 was carried out to provide a tape-shaped prepreg 110 having a different width and a different thickness. Results are shown in Tables 1-3.

Example 14

Except that the Pc/Qp ratio was $18.1 \times 10^8$, the same procedure as in Example 13 was carried out to provide a tape-shaped prepreg 110. Results are shown in Tables 1-3.

Example 15

Except that the nozzle of the tank 104 had a gap width of 300 mm, the same procedure as in Example 2 was carried out to provide a tape-shaped prepreg 110 having a different width and a different thickness. Results are shown in Tables 1-3.

Example 16

Except that the Pc/Qp ratio was $18.1 \times 10^8$, the same procedure as in Example 15 was carried out to provide a tape-shaped prepreg 110. Results are shown in Tables 1-3.

Example 17

Except that the nozzle of the tank 104 had a gap thickness of 0.30 mm, the same procedure as in Example 15 was carried out to provide a tape-shaped prepreg 110 having a different width and a different thickness. Results are shown in Tables 1-3.

Example 18

Except that the Pc/Qp ratio was $18.1 \times 10^8$, the same procedure as in Example 17 was carried out to provide a tape-shaped prepreg 110. Results are shown in Tables 1-3.

Example 19

Except that the shape and number of the cooling members of the cooling mechanism were as described under (c-2), the same procedure as in Example 13 was carried out to provide a tape-shaped prepreg 110. Results are shown in Tables 2-1.

Example 20

Except that the Pc/Qp ratio was $18.1 \times 10^8$, the same procedure as in Example 19 was carried out to provide a tape-shaped prepreg 110. Results are shown in Tables 2-1.

Example 21

Except that the shape and number of the cooling members of the cooling mechanism were as described under (c-2), the same procedure as in Example 2 was carried out to provide a tape-shaped prepreg 110. Results are shown in Tables 2-1.

Example 22

Except that the Pc/Qp ratio was $18.1 \times 10^8$, the same procedure as in Example 21 was carried out to provide a tape-shaped prepreg 110. Results are shown in Tables 2-1.

Example 23

Except that the nozzle of the tank 104 had a gap thickness of 0.30 mm, the same procedure as in Example 21 was carried out to provide a tape-shaped prepreg 110 having a different width and a different thickness. Results are shown in Tables 2-1.

Example 24

Except that the Pc/Qp ratio was $18.1 \times 10^8$, the same procedure as in Example 23 was carried out to provide a tape-shaped prepreg 110. Results are shown in Tables 2-1.

Example 25

Except that the nozzle of the tank 104 had a gap width of 300 mm, the same procedure as in Example 21 was carried out to provide a tape-shaped prepreg 110 having a different width and a different thickness. Results are shown in Tables 2-2.

Example 26

Except that the Pc/Qp ratio was $18.1 \times 10^8$, the same procedure as in Example 25 was carried out to provide a tape-shaped prepreg 110. Results are shown in Tables 2-2.

Example 27

Except that the nozzle of the tank 104 had a gap thickness of 0.30 mm, the same procedure as in Example 25 was carried out to provide a tape-shaped prepreg 110 having a different width and a different thickness. Results are shown in Tables 2-2.

Example 28

Except that the Pc/Qp ratio was $18.1 \times 10^8$, the same procedure as in Example 27 was carried out to provide a tape-shaped prepreg 110. Results are shown in Tables 2-2.

Comparative Example 1

Except that the Pc/Qp ratio was $1.0 \times 10^8$, the same procedure as in Example 1 was carried out to provide a tape-shaped prepreg 110. Results are shown in Tables 3-1.

Comparative Example 2

Except that the nozzle of the tank 104 had a gap thickness of 0.20 mm, the same procedure as Comparative example 1 was carried out to provide a tape-shaped prepreg 110 having a different thickness. Results are shown in Tables 3-1.

Comparative Example 3

Except that the nozzle of the tank 104 had a gap thickness of 0.50 mm, the same procedure as Comparative example 1 was carried out to provide a tape-shaped prepreg 110 having a different thickness. Results are shown in Tables 3-1.

Comparative Example 4

Except that the nozzle of the tank 104 had a gap thickness of 0.15 mm, the same procedure as Comparative example 1 was carried out to provide a tape-shaped prepreg 110 having a different thickness. Results are shown in Tables 3-1.

Comparative Example 5

Except that the Pc/Qp ratio was $1.0 \times 10^8$, the same procedure as in Example 13 was carried out to provide a tape-shaped prepreg 110. Results are shown in Tables 3-1.

Comparative Example 6

Except that the nozzle of the tank 104 had a gap width of 300 mm, the same procedure as Comparative example 4 was carried out to provide a tape-shaped prepreg 110 having a different thickness. Results are shown in Tables 3-1.

Comparative Example 7

Except that the nozzle of the tank 104 had a gap thickness of 0.30 mm, the same procedure as Comparative example 6 was carried out to provide a tape-shaped prepreg 110 having a different thickness. Results are shown in Tables 3-1.

Comparative Example 8

Except that the shape and number of the cooling members of the cooling mechanism were as described under (c-2), the same procedure as in Comparative example 4 was carried out to provide a tape-shaped prepreg 110. Results are shown in Tables 3-2.

Comparative Example 9

Except that the nozzle of the tank 104 had a gap thickness of 0.30 mm, the same procedure as Comparative Example 8 was carried out to provide a tape-shaped prepreg 110 having a different thickness. Results are shown in Tables 3-2.

Comparative Example 10

Except that the shape and number of the cooling members of the cooling mechanism were as described under (c-2), the same procedure as in Comparative example 5 was carried out to provide a tape-shaped prepreg 110. Results are shown in Tables 3-2.

Comparative Example 11

Except that the nozzle of the tank 104 had a gap width of 300 mm, the same procedure as Comparative example 8 was carried out to provide a tape-shaped prepreg 110 having a different thickness. Results are shown in Tables 3-2.

Comparative Example 12

Except that the nozzle of the tank 104 had a gap thickness of 0.30 mm, the same procedure as Comparative example 11 was carried out to provide a tape-shaped prepreg 110 having a different thickness. Results are shown in Tables 3-2.

TABLE 1-1

|  |  | Example 1 | Example 2 | Example 3 | Example 4 | Example 5 | Example 6 | Example 7 |
|---|---|---|---|---|---|---|---|---|
| Reinforcing fiber | type | a-1 | a-1 | a-1 | a-1 | a-1 | a-1 | a-1 |
| Thermoplastic resin | type | b-1 | b-1 | b-1 | b-1 | b-1 | b-1 | b-1 |
| Members of cooling mechanism | shape, number | c-1 | c-1 | c-1 | c-1 | c-1 | c-1 | c-1 |
|  | Ra [μm] | 0.2 | 0.2 | 0.2 | 0.2 | 12.0 | 12.0 | 12.0 |
| Pc/Qp |  | $5.7 \times 10^8$ | $5.7 \times 10^8$ | $5.7 \times 10^8$ | $5.7 \times 10^8$ | $5.7 \times 10^8$ | $5.7 \times 10^8$ | $5.7 \times 10^8$ |
| Width of nozzle | [mm] | 50 | 50 | 50 | 50 | 50 | 50 | 50 |
| Thickness of nozzle | [mm] | 0.30 | 0.15 | 0.20 | 0.50 | 0.30 | 0.20 | 0.50 |
| Fiber volume content | (vol %) | 50 | 50 | 50 | 50 | 50 | 50 | 50 |
| Void content | (vol %) | 2.2 | 1.4 | 1.8 | 2.3 | 2.3 | 1.9 | 2.5 |
| Warpage rate | (%) | 1.2 | 1.1 | 1.6 | 0.9 | 1.1 | 1.3 | 0.9 |
| Surface roughness of prepreg | Ra [μm] | 4.2 | 4.1 | 4.2 | 4.1 | 13.4 | 13.2 | 13.5 |
| maximum cross-sectional height in waviness curve | Wt [μm] | 43 | 46 | 45 | 38 | 46 | 47 | 40 |
| Handleability *1 |  | A | A | A | A | B | B | B |

*1 A: handleable without difficulty, B: handleable though requiring careful work, C: handling is difficult.

TABLE 1-2

|  |  | Example 8 | Example 9 | Example 10 | Example 11 | Example 12 |
|---|---|---|---|---|---|---|
| Reinforcing fiber | type | a-1 | a-1 | a-1 | a-1 | a-1 |
| Thermoplastic resin | type | b-1 | b-1 | b-1 | b-1 | b-1 |
| Members of cooling mechanism | shape, number | c-1 | c-1 | c-1 | c-1 | c-1 |
|  | Ra [μm] | 0.2 | 0.2 | 0.2 | 0.2 | 0.2 |
| Pc/Qp |  | $5.7 \times 10^8$ | $5.7 \times 10^8$ | $5.7 \times 10^8$ | $18.1 \times 10^8$ | $18.1 \times 10^8$ |
| Width of nozzle | [mm] | 50 | 50 | 50 | 50 | 50 |
| Thickness of nozzle | [mm] | 0.30 | 0.30 | 0.30 | 0.30 | 0.15 |
| Fiber volume content | (vol %) | 40 | 60 | 50 | 50 | 50 |
| Void content | (vol %) | 1.4 | 2.4 | 5.5 | 2.3 | 1.3 |
| Warpage rate | (%) | 2.4 | 1.0 | 1.8 | 0.9 | 0.7 |
| Surface roughness of prepreg | Ra [μm] | 3.8 | 4.5 | 6.1 | 4.0 | 3.9 |
| Maximum cross-sectional height in waviness curve | Wt [μm] | 42 | 43 | 46 | 35 | 38 |
| Handleability *1 |  | A | A | B | A | A |

*1 A: handleable without difficulty, B: handleable though requiring careful work, C: handling is difficult.

TABLE 1-3

|  |  | Example 13 | Example 14 | Example 15 | Example 16 | Example 17 | Example 18 |
|---|---|---|---|---|---|---|---|
| Reinforcing fiber | type | a-1 | a-1 | a-1 | a-1 | a-1 | a-1 |
| Thermoplastic resin | type | b-1 | b-1 | b-1 | b-1 | b-1 | b-1 |
| Members of cooling mechanism | shape, number | c-1 | c-1 | c-1 | c-1 | c-1 | c-1 |
|  | Ra [µm] | 0.2 | 0.2 | 0.2 | 0.2 | 0.2 | 0.2 |
| Pc/Qp |  | $5.7 \times 10^8$ | $18.1 \times 10^8$ | $5.7 \times 10^8$ | $18.1 \times 10^8$ | $5.7 \times 10^8$ | $18.1 \times 10^8$ |
| Width of nozzle | [mm] | 10 | 10 | 300 | 300 | 300 | 300 |
| Thickness of nozzle | [mm] | 0.05 | 0.05 | 0.15 | 0.15 | 0.30 | 0.30 |
| Fiber volume content | (vol %) | 50 | 50 | 50 | 50 | 50 | 50 |
| Void content | (vol %) | 0.8 | 0.8 | 1.8 | 2.0 | 2.2 | 2.1 |
| Warpage rate | (%) | 0.6 | 0.3 | 1.8 | 1.5 | 2.1 | 1.9 |
| Surface roughness of prepreg | Ra [µm] | 3.6 | 3.4 | 3.8 | 3.9 | 4.8 | 4.3 |
| Maximum cross-sectional height in waviness curve | Wt [µm] | 36 | 32 | 56 | 52 | 50 | 51 |
| Handleability *1 |  | A | A | B | B | B | B |

*1 A: handleable without difficulty, B: handleable though requiring careful work, C: handling is difficult.

TABLE 2-1

|  |  | Example 19 | Example 20 | Example 21 | Example 22 | Example 23 | Example 24 |
|---|---|---|---|---|---|---|---|
| Reinforcing fiber | type | a-1 | a-1 | a-1 | a-1 | a-1 | a-1 |
| Thermoplastic resin | type | b-1 | b-1 | b-1 | b-1 | b-1 | b-1 |
| Members of cooling mechanism | shape, number | c-2 | c-2 | c-2 | c-2 | c-2 | c-2 |
|  | Ra [µm] | 0.2 | 0.2 | 0.2 | 0.2 | 0.2 | 0.2 |
| Pc/Qp |  | $5.7 \times 10^8$ | $18.1 \times 10^8$ | $5.7 \times 10^8$ | $18.1 \times 10^8$ | $5.7 \times 10^8$ | $18.1 \times 10^8$ |
| Width of nozzle | [mm] | 10 | 10 | 50 | 50 | 50 | 50 |
| Thickness of nozzle | [mm] | 0.05 | 0.05 | 0.15 | 0.15 | 0.30 | 0.30 |
| Fiber volume content | (vol %) | 50 | 50 | 50 | 50 | 50 | 50 |
| Void content | (vol %) | 0.9 | 0.9 | 1.2 | 1.5 | 2.2 | 2.1 |
| Warpage rate | (%) | 0.5 | 0.3 | 0.8 | 0.7 | 1.2 | 1.2 |
| Surface roughness of prepreg | Ra [µm] | 4.0 | 3.8 | 4.3 | 4.1 | 4.8 | 4.4 |
| Maximum cross-sectional height in waviness curve | Wt [µm] | 40 | 37 | 44 | 39 | 42 | 36 |
| Handleability *1 |  | A | A | A | A | A | A |

*1 A: handleable without difficulty, B: handleable though requiring careful work, C: handling is difficult.

TABLE 2-2

|  |  | Example 25 | Example 26 | Example 27 | Example 28 |
|---|---|---|---|---|---|
| Reinforcing fiber | type | a-1 | a-1 | a-1 | a-1 |
| Thermoplastic resin | type | b-1 | b-1 | b-1 | b-1 |
| Members of cooling mechanism | shape, number | c-2 | c-2 | c-2 | c-2 |
|  | Ra [µm] | 0.2 | 0.2 | 0.2 | 0.2 |
| Pc/Qp |  | $5.7 \times 10^8$ | $18.1 \times 10^8$ | $5.7 \times 10^8$ | $18.1 \times 10^8$ |
| Width of nozzle | [mm] | 300 | 300 | 300 | 300 |
| Thickness of nozzle | [mm] | 0.15 | 0.15 | 0.30 | 0.30 |
| Fiber volume content | (vol %) | 50 | 50 | 50 | 50 |
| Void content | (vol %) | 1.7 | 1.8 | 2.3 | 1.9 |
| Warpage rate | (%) | 1.6 | 1.8 | 2.1 | 2.0 |
| Surface roughness of prepreg | Ra [µm] | 4.1 | 4.0 | 4.9 | 4.7 |
| Maximum cross-sectional height in waviness curve | Wt [µm] | 55 | 53 | 51 | 53 |
| Handleability *1 |  | A | A | A | A |

*1 A: handleable without difficulty, B: handleable though requiring careful work, C: handling is difficult.

TABLE 3-1

| | | Comparative example 1 | Comparative example 2 | Comparative example 3 | Comparative example 4 | Comparative example 5 | Comparative example 6 | Comparative example 7 |
|---|---|---|---|---|---|---|---|---|
| Reinforcing fiber | type | a-1 | a-1 | a-1 | a-1 | a-1 | a-1 | a-1 |
| Thermoplastic resin | type | b-1 | b-1 | b-1 | b-1 | b-1 | b-1 | b-1 |
| Members of cooling mechanism | shape, number | c-1 | c-1 | c-1 | c-1 | c-1 | c-1 | c-1 |
| | Ra [μm] | 0.2 | 0.2 | 0.2 | 0.2 | 0.2 | 0.2 | 0.2 |
| Pc/Qp | | $1.0 \times 10^8$ | $1.0 \times 10^8$ | $1.0 \times 10^8$ | $1.0 \times 10^8$ | $1.0 \times 10^8$ | $1.0 \times 10^8$ | $1.0 \times 10^8$ |
| Width of nozzle | [mm] | 50 | 50 | 50 | 50 | 10 | 300 | 300 |
| Thickness of nozzle | [mm] | 0.30 | 0.20 | 0.50 | 0.15 | 0.05 | 0.15 | 0.30 |
| Fiber volume content | (vol %) | 50 | 50 | 50 | 50 | 50 | 50 | 50 |
| Void content | (vol %) | 2.0 | 1.7 | 2.1 | 1.4 | 0.9 | 1.9 | 2.2 |
| Warpage rate | (%) | 10.8 | 11.1 | 10.2 | 11.2 | 14.1 | 18.2 | 15.4 |
| Surface roughness of prepreg | Ra [μm] | 18.1 | 18.5 | 18.2 | 12.2 | 18.1 | 23.5 | 25.2 |
| Maximum cross-sectional height in waviness curve | Wt [μm] | 95 | 102 | 88 | 105 | 87 | 121 | 118 |
| Handleability *1 | | C | C | C | C | C | C | C |

*1 A: handleable without difficulty, B: handleable though requiring careful work, C: handling is difficult.

TABLE 3-2

| | | Comparative example 8 | Comparative example 9 | Comparative example 10 | Comparative example 11 | Comparative example 12 |
|---|---|---|---|---|---|---|
| Reinforcing fiber | type | a-1 | a-1 | a-1 | a-1 | a-1 |
| Thermoplastic resin | type | b-1 | b-1 | b-1 | b-1 | b-1 |
| Members of cooling mechanism | shape, number | c-2 | c-2 | c-2 | c-2 | c-2 |
| | Ra [μm] | 0.2 | 0.2 | 0.2 | 0.2 | 0.2 |
| Pc/Qp | | $1.0 \times 10^8$ | $1.0 \times 10^8$ | $1.0 \times 10^8$ | $1.0 \times 10^8$ | $1.0 \times 10^8$ |
| Width of nozzle | [mm] | 50 | 50 | 10 | 300 | 300 |
| Thickness of nozzle | [mm] | 0.15 | 0.30 | 0.05 | 0.15 | 0.30 |
| Fiber volume content | (vol %) | 50 | 50 | 50 | 50 | 50 |
| Void content | (vol %) | 1.2 | 1.8 | 0.8 | 1.7 | 2.1 |
| Warpage rate | (%) | 13.2 | 13.5 | 16.2 | 17.4 | 16.3 |
| Surface roughness of prepreg | Ra [μm] | 22.3 | 23.8 | 18.5 | 24.1 | 25.5 |
| Maximum cross-sectional height in waviness curve | Wt [μm] | 103 | 98 | 85 | 118 | 122 |
| Handleability *1 | | C | C | C | C | C |

*1 A: handleable without difficulty, B: handleable though requiring careful work, C: handling is difficult.

EXPLANATION OF NUMERALS

100 production apparatus
101 reinforcing fiber
102 bobbin
103 yarn guide
104 tank
105 feeder
106 discharge port
107 thermoplastic resin composition
108 cooling mechanism
109 pull roll
110 tape-shaped prepreg
111 winding roll
200 cooling mechanism of a roller-shaped member type tape-shaped prepreg holding structure that contains only one roller-shaped member
201 tape-shaped prepreg
202 roller-shaped member
203 cooling mechanism of a roller-shaped member type tape-shaped prepreg holding structure that contains two roller-shaped members
204 cooling mechanism of a roller-shaped member type tape-shaped prepreg holding structure that contains four roller-shaped members
300 cooling mechanism of a roller-shaped member type tape-shaped prepreg interposing structure that contains two roller-shaped members
301 tape-shaped prepreg
302 roller-shaped member
303 cooling mechanism of a roller-shaped member type tape-shaped prepreg interposing structure that contains four roller-shaped members
400 cooling mechanism of a plate-shaped member type tape-shaped prepreg interposing structure that contains only one plate-shaped member
401 tape-shaped prepreg
402 plate-shaped member
403 cooling mechanism of a plate-shaped member type tape-shaped prepreg interposing structure that contains two plate-shaped members
404 cooling mechanism of a plate-shaped member type tape-shaped prepreg interposing structure that contains four plate-shaped members
500 cooling mechanism containing one roller-shaped member and one plate-shaped member
501 tape-shaped prepreg
502 roller-shaped member
503 plate-shaped member 504 cooling mechanism containing two roller-shaped members and two plate-shaped members

The invention claimed is:

1. A tape-shaped prepreg comprising unidirectionally oriented reinforcing fibers and a thermoplastic resin composition, wherein the tape-shaped prepreg has
an arithmetic average roughness (Ra) of 0.1 to 10 μm in a direction perpendicular to the orientation direction of the reinforcing fibers, as measured according to JIS B 0601: 2013, and
a warpage rate of 5% or less as determined by the procedure specified in (i) to (iii) below:
(i) a test piece of the above tape-shaped prepreg having a length of 100 mm is placed in the fiber orientation direction on a plane in such manner that the end portions curl upward,
(ii) the vertical distance from the highest position at the right end of the curled tape to the plane, which is denoted by a, and the vertical distance from the highest position at the left end to the plane, which is denoted by b, are measured and the arithmetic average of a and b is calculated, which is defined as the warpage distance, and
(iii) the warpage rate is calculated based on the following equation:

warpage rate (%)=warpage distance (mm)/100 (mm)×100, wherein
the tape-shaped prepreg has a thickness of 0.20 to 15 mm and
the tape-shaped prepreg exhibits a waviness curve having a maximum cross-sectional height (Wt) of 80 μm or less in a direction perpendicular to the orientation direction of the reinforcing fibers, as measured according to JIS B 0601: 2013.

2. A tape-shaped prepreg according to claim 1, wherein the reinforcing fiber accounts for a fiber volume content of 30% to 70%.

3. A tape-shaped prepreg according to claim 1 having a void content of 5 vol % or less.

4. A tape-shaped prepreg according to claim 1, wherein the thermoplastic resin composition is a polyamide resin composition.

5. A tape-shaped prepreg according to claim 1, wherein the reinforcing fiber is carbon fiber.

6. A tape-shaped prepreg according to claim 1, wherein the tape-shaped prepreg has a width of 50 mm or more.

7. A method for producing the tape-shaped prepreg according to claim 1 which comprises:
putting a thermoplastic resin composition in a molten state into a tank having an inlet portion and an outlet portion,
introducing a plurality of continuous reinforcing fibers from the inlet portion of the tank so that they are impregnated with the resin composition, and
causing the thermoplastic resin composition and the plurality of continuous reinforcing fibers to exit through the outlet portion of the tank and then pass through a cooling mechanism to produce a tape-shaped prepreg,
wherein the following relation (A) holds between Pc and Qp, wherein Pc [W] is the heat absorbing capacity of the cooling mechanism and Qp [m³/s] is the volume of the tape-shaped prepreg passing through the cooling mechanism in one second:

$$2.8 \times 10^8 \leq Pc/Qp \leq 23.2 \times 10^8 \quad (A).$$

8. A method for producing a tape-shaped prepreg according to claim 7, wherein one or a plurality of roller-shaped cooling members are included in the cooling mechanism.

9. A method for producing a tape-shaped prepreg according to claim 7, wherein one or a plurality of plate-shaped cooling members are included in the cooling mechanism.

10. A method for producing a tape-shaped prepreg according to claim 7, wherein both one or a plurality of roller-shaped cooling members and one or a plurality of plate-shaped cooling members are included in the cooling mechanism.

11. A method for producing a tape-shaped prepreg according to claim 7, wherein the temperature of the cooling members of the cooling mechanism can be controlled.

12. A method for producing a tape-shaped prepreg according to claim 10, wherein:
a plurality of cooling members are included in the cooling mechanism, and
the temperature of each cooling member of the cooling mechanism can be controlled independently.

13. A method for producing a tape-shaped prepreg according to claim 7, wherein at least two cooling members located opposite to each other are included in the cooling mechanism to allow the tape-shaped prepreg to travel therebetween.

14. A method for producing a tape-shaped prepreg according to claim 13, wherein the distance between the two cooling members can be adjusted as desired.

15. A method for producing a tape-shaped prepreg according to claim 13, wherein the force exerted for fixing the two cooling members at specific positions can be adjusted as desired.

16. A method for producing a tape-shaped prepreg according to claim 7, wherein the tape-shaped prepreg solidified while passing through the cooling mechanism is wound up.

17. A method for producing a tape-shaped prepreg according to claim 7, wherein a plurality of parallel strips of a tape-shaped prepreg are allowed travel simultaneously.

18. A method for producing a tape-shaped prepreg according to claim 7, wherein the plurality of continuous reinforcing fibers impregnated with a thermoplastic resin composition are oriented in the traveling direction as they pass through the outlet portion of the tank.

19. A method for producing a tape-shaped prepreg according to claim 7, wherein the thermoplastic resin composition is a polyamide resin composition.

20. A method for producing a tape-shaped prepreg according to claim 7, wherein the continuous reinforcing fiber is carbon fiber.

* * * * *